United States Patent [19]
Thorndike et al.

[11] Patent Number: 5,381,517
[45] Date of Patent: Jan. 10, 1995

[54] FUZZY SPREADSHEET DATA PROCESSING SYSTEM

[75] Inventors: Karl E. Thorndike, Knoxville; Joseph A. Vrba, Clinton, both of Tenn.

[73] Assignee: FuziWare, Inc., Knoxville, Tenn.

[21] Appl. No.: 949,268

[22] Filed: Sep. 21, 1992

[51] Int. Cl.⁶ ............................................. G06F 9/44
[52] U.S. Cl. ................................. 395/61; 395/900; 395/76
[58] Field of Search ................... 395/51, 61, 76, 77, 395/900

[56] References Cited

U.S. PATENT DOCUMENTS

| | | | |
|---|---|---|---|
| 5,189,728 | 2/1993 | Yamakawa et al. | 395/900 |
| 5,239,620 | 8/1993 | Yamakawa et al. | 395/51 |
| 5,245,698 | 9/1993 | Matsunaga | 395/61 |
| 5,249,257 | 9/1993 | Akahori et al. | 395/61 |
| 5,305,425 | 4/1994 | Ishida et al. | 395/51 |

OTHER PUBLICATIONS

Russo, "A User–Friendly Research Tool for Image Processing with Fuzzy Rules", IEEE Int'l Conf. on Fuzzy Systems, pp. 561–568, Mar. 8–12, 1992.

*Primary Examiner*—Allen R. MacDonald
*Assistant Examiner*—Stuart B. Shapiro
*Attorney, Agent, or Firm*—Luedeka, Neely & Graham

[57] ABSTRACT

A data processing system includes a memory with instructions and data stored therein. A fuzzy spreadsheet is stored in memory and has a plurality of cells, preferably arranged in columns and rows. The processor, stored instructions and stored data comprise a controller that receives input data and stores representations in cells. These representations include representations of fuzzy values. Operations, such as arithmetic operations, are performed on the data stored in the cells, including the fuzzy values, to produce derived representations that are stored in the cells and may be fuzzy values or crisp numbers or text. To facilitate a user's appreciation of a particular fuzzy number, the spreadsheet selectively simultaneously displays two representations of a fuzzy value, namely, a centroid and a graph. Also, the processor converts crisp numbers to fuzzy numbers by a procedure whereby a gallery of graphs stored in memory is displayed and, in response to user commands, at least three crisp numbers are associated with the graph. The processor also defuzzifies numbers by replacing a representation of a fuzzy number in a cell of the spreadsheet with a centroid.

12 Claims, 8 Drawing Sheets

Microfiche Appendix Included
(4 Microfiche, 374 Pages)

Fig. 4

FuziCalc - [C:\FCALC\LESSON1.FZS]

File  Edit  Fuzzy  Formula  Format  Options  Windows  Help

=D3~D4

| | A | B | C | D | E | F | G | H | I | J |
|---|---|---|---|---|---|---|---|---|---|---|
| 1 | | | Downlites | Spotlites | Custom | Total | | | | |
| 2 | | | | | | | | | | |
| 3 | Units, Thousands | | 160 | 45 | 16 | | | | | |
| 4 | Average Unit Price | | $59.65 | $153.21 | $225.50 | | | | | |
| 5 | | | | | | | | | | |
| 6 | | | | | | | | | | |
| 7 | Total | | 9544 | 6894.45 | 3608 | 20046.45 | | | | |
| 8 | | | | | | | | | | |
| 9 | | | | | | | | | | |
| 10 | | | | | | | | | | |
| 11 | | | | | | | | | | |
| 12 | | | | | | | | | | |
| 13 | | | | | | | | | | |
| 14 | | | | | | | | | | |
| 15 | | | | | | | | | | |
| 16 | | | | | | | | | | |
| 17 | | | | | | | | | | |

Ready

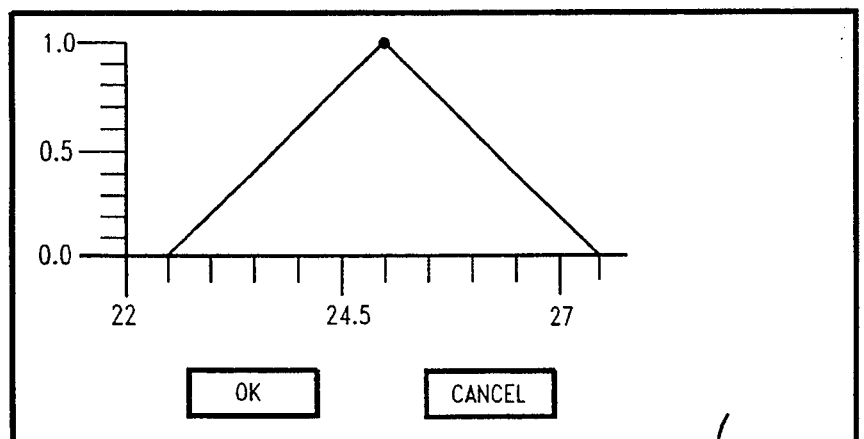
Fig. 7
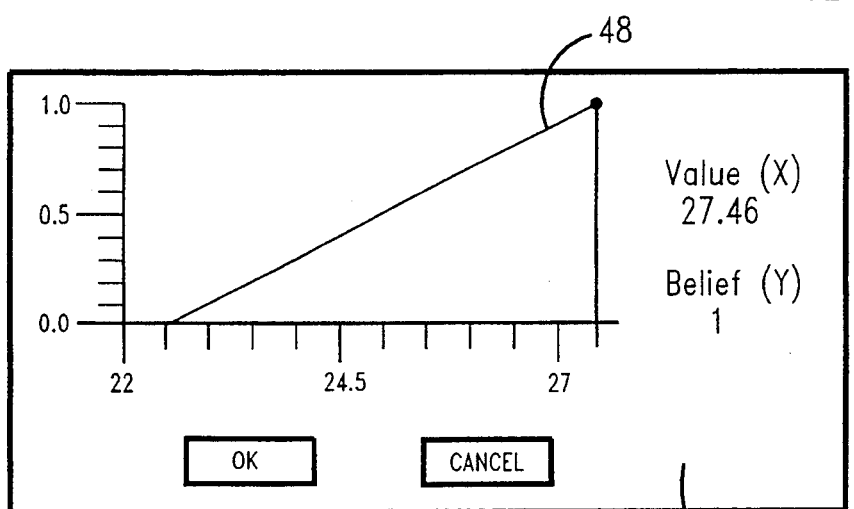
Fig. 8
Fig. 9

FUZZY SPREADSHEET DATA PROCESSING SYSTEM

FIELD OF INVENTION

The present application relates to data processing systems implementing spreadsheets and particularly relates to a data processing system that stores representations of fuzzy numbers in cells of a spreadsheet, operates on fuzzy numbers, and displays fuzzy numbers in both a spreadsheet format and a graphical format.

REFERENCE TO MICROFICHE APPENDIX

A listing of a computer program used in the preferred embodiment of the invention is provided in machine readable format in a microfiche appendix composed of four (4) microfiche with a total number of three hundred seventy-four (374) frames.

BACKGROUND OF INVENTION

There are numerous data processing systems that implement a spreadsheet program. Most spreadsheets include a plurality of cells arranged in rows and columns and typically operations are performed on numbers stored in the cells. For example, the number in cell A1 may be multiplied by the number in cell A2 and the product stored in cell A3.

Generally, spreadsheets require the user to input precise numbers (which are referred to herein as crisp numbers) even though the user recognizes that his real world problem cannot be represented precisely by a crisp number. For example, a user may expect to sell about 10 widgets a week for about $10.00 each, but he recognizes that he might sell more or less than 10 widgets per week and he probably will be required to discount the $10.00 price to certain customers. Since the typical spreadsheet will not accept numbers like "about 10 widgets" or "equal to or less than $10.00", the user may produce numerous different spreadsheet outputs using a "what if" approach to identify numerous possible sales conditions and results. For example, the first spreadsheet might multiply $10.00 times 10 widgets and show a result of $100. Next, the user may multiply 10 widgets times $9.50 to produce a result of $95.00. By constantly changing the crisp numbers in the spreadsheet, the user tries to obtain a meaningful output that represents his problem. Each of the outputs from the spreadsheet program may be precise in the sense that the crisp numbers are multiplied correctly, but the result may not be considered accurate because it does not reflect the real world uncertainty of the problem. The number "about 10" might be considered a more accurate description of a real world condition than the "crisp number", even though the crisp number is always more precise. The inaccuracy of precise numbers in representing certain situations represents a major limitation of conventional spreadsheets.

BRIEF SUMMARY OF INVENTION

The present invention solves the foregoing accuracy problems and provides other significant advantages over conventional spreadsheets by providing a data processing system that produces a fuzzy spreadsheet, that is, a spreadsheet that accepts fuzzy numbers and performs various operations on fuzzy numbers to produce a fuzzy or crisp output. In accordance with the present invention, a data processing system includes a memory and instructions and data stored in the memory. The stored instructions and stored data include a data processing representation of a fuzzy spreadsheet. The fuzzy spreadsheet has elements of at least one dimension and the elements include a plurality of cells for holding data. A data processor is provided and input devices, such as a keyboard and a mouse, are provided for inputing data and instructions to the processor. The processor, stored instructions, and stored data further comprise a controller that receives input data and input instructions and, in response thereto, produces and stores representations in the cells of the fuzzy spreadsheet. The representations stored in the cells may be crisp numbers or a representation of a fuzzy value. An operator performs operations on the data stored in the cells in response to input instructions and stored instructions to produce derived representations. These operations may selectively include operations on representations of fuzzy values that are stored in the cells. In such a case, the operator produces a derived representation of a fuzzy value that bears a relationship to at least one of the fuzzy values stored in the cells and on which operations were performed. In the preferred embodiment, the result of an operation, the derived representation, is the product of, or is representative of, all that went into it, except that compression may reduce some detail. The derived representations are stored in one of the fuzzy spreadsheet cells.

When reference is made herein to storing something in a cell, this terminology is used broadly and it includes storing a pointer or other information that references a data location. For example, when a fuzzy number is stored in a cell, a handle or pointer is associated with the cell and it references a centroid to be displayed in the cell and a set of numbers to be displayed as a fuzzy graph. This data is deemed to be "stored in the cell." In the preferred embodiment, the data processing system also includes a display for displaying the data in the cells of the fuzzy spreadsheet and for simultaneously displaying two representations of a selected fuzzy value. Preferably, the centroid of the fuzzy value is displayed inside a block representing the selected cell and a graph is displayed in a separate box representing the shape (belief distribution) of the fuzzy value. The graph shows a crisp number value on the X axis and a belief value on the Y axis.

Also in the preferred embodiment, crisp numbers are converted to representations of fuzzy values by displaying a gallery of graphs representing a plurality of shapes corresponding to belief distributions. A convertor converts a crisp number to a representation of fuzzy value by associating the crisp number with a selected one of the graphs and at least two other crisp numbers (or points on the graph).

Operations are performed on representations of fuzzy values in the cells. For example, a fuzzy value in cell A1 may be multiplied by a fuzzy value in cell A2 to produce a fuzzy value that is stored in A3.

The processor, stored instructions, and stored data may further comprise an adjustor for adjusting the shape of a displayed graph of a fuzzy number and adjusting the centroid of the fuzzy number to reflect the adjustments in the graph.

BRIEF DESCRIPTION OF THE DRAWINGS

The present invention may best be understood by reference to the Detailed Description of a preferred embodiment when considered in conjunction with the accompanying drawings in which:

FIG. 4 shows a spreadsheet with only crisp numbers shown in the cells;

FIG. 7 is a view of the Adjust Fuzzy Value Dialog Box;

FIG. 8 is a view of the fuzzy value box showing an adjusted fuzzy value graph;

FIG. 9 shows the display used to input precise locations on a fuzzy value graph.

DETAILED DESCRIPTION OF THE PREFERRED EMBODIMENT

Figure 1:
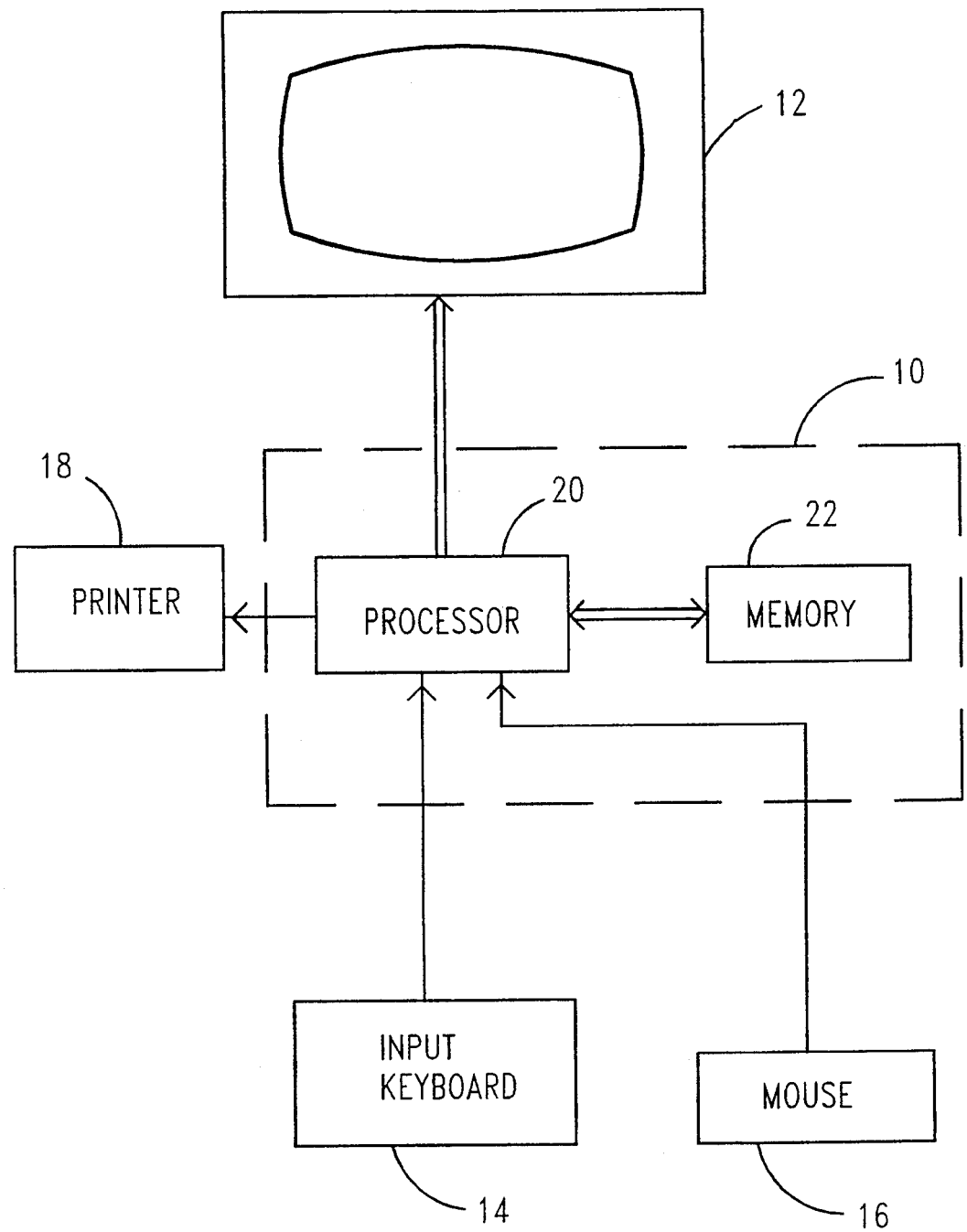
FIG. 1 is a block diagram illustrating the data processing system of the invention.

The present invention is a digital data processing system programmed to display and perform spreadsheet functions. Referring to FIG. 1, the preferred embodiment is a computer 10 which is an IBM compatible PC running DOS and Windows 3.1 in 386 enhanced mode. Both DOS and Windows 3.1 are products of MicroSoft, Inc. Computer 10 includes the usual peripherals of a monitor 12 which functions as a display, input devices such as a keyboard 14 and a mouse 16, and a printer 18. The computer itself would comprise in part a processor 20 communicating with memory 22 which represents random access memory, read only memory, and mass magnetic storage memory such as a disk drive. The program, named FuziCalc, operating the computer 10 is written in the C language, specifically Microsoft C 7.0, and the machine readable code (executable file) is attached as a microfiche appendix. Since the complete program is provided as an appendix, the operation and general content of the program will be described below, after describing some of the terminology and conventions used herein.

Figure 2:
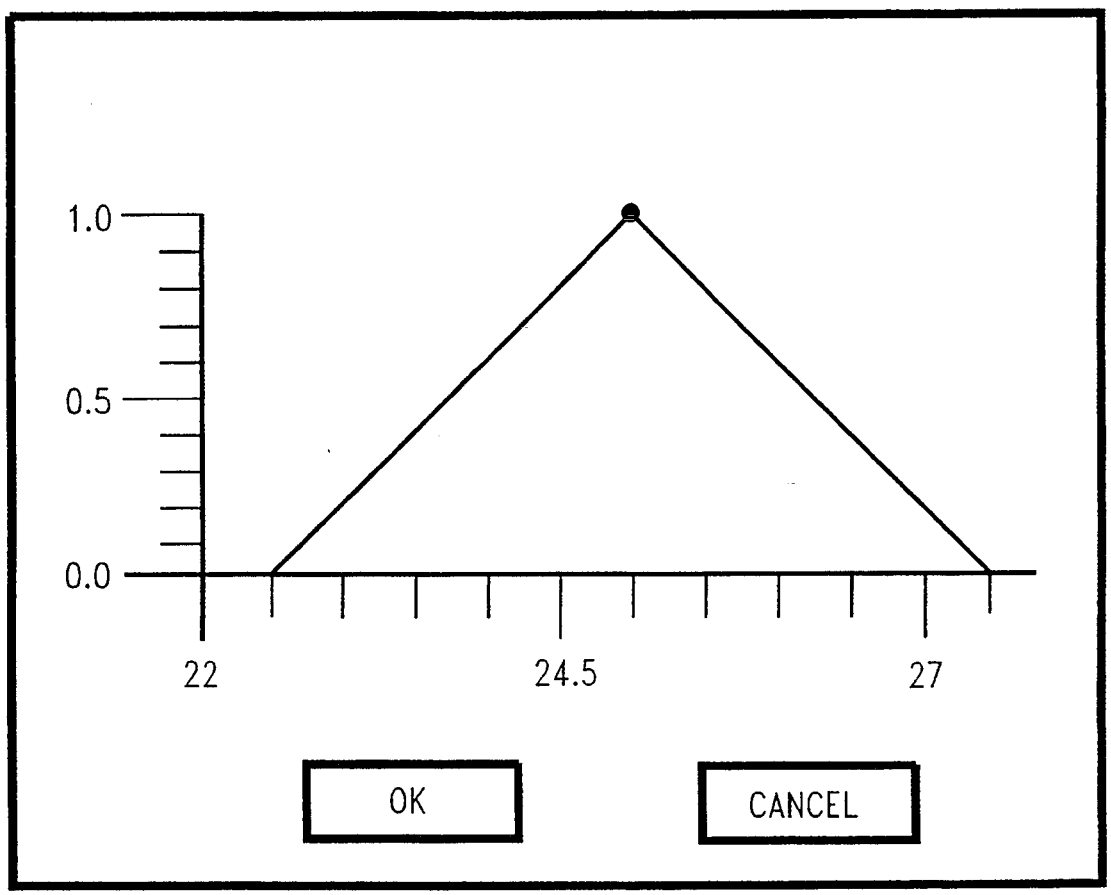
FIG. 2 is an illustration of a graph depicting a simple fuzzy number and it constitutes a display of the preferred embodiment.

The concept of fuzziness does not imply unclear or clouded thinking, and fuzziness is not another form of probability. Instead, fuzzy values or fuzzy numbers are points lists or representations that depict the ambiguity of an event or value itself. A fuzzy value may be represented as a graph or as a list of numbers. For example, a "triangular fuzzy number" may be defined by three crisp numbers (a points list); a low limit, a high limit and a peak value, which is the value having the highest level of belief. Such a triangular fuzzy number is represented in FIG. 2 showing a fuzzy graph having a high limit of 27.5, a low limit of 22.5, and a peak value of 25. Since 27.5 and 22.5 have a belief of 0, they are not part of a "set" of numbers, and thus a fuzzy number may be thought of as a points list, rather than a set, because the high and low limits have a zero (0) belief value and it is somewhat inconsistent to characterize them as members of a set. In this particular example, the center value 25 is shown having a belief of 1.0 and the other two values have a belief of 0. Thus, FIG. 2 represents a list of values where the X axis represents a number value and the Y axis represents a belief value, and the graph itself may be referred to as a belief distribution graph. The fuzzy value set represented by FIG. 2 would be (22.5, 0); (25, 1.0); and (27.5, 0).

It will be appreciated that the graph of FIG. 2 may reflect a real world belief about an uncertain number. It is believed most strongly that the number is or will be "25" but it may be more or less. It is also believed that the number will not be less than "22.5" or more than "27.5". By adjusting the shape of the graph, a user may achieve a graphical representation of his or her true belief concerning the value of an uncertain number.

With this background in mind, the fuzzy spreadsheet will be described. The format of the fuzzy spreadsheet in this embodiment is dictated by the format of Windows 3.1, which is a conventional and highly popular program and format. This format should facilitate the understanding of the operation and control of the program.

Figure 3:
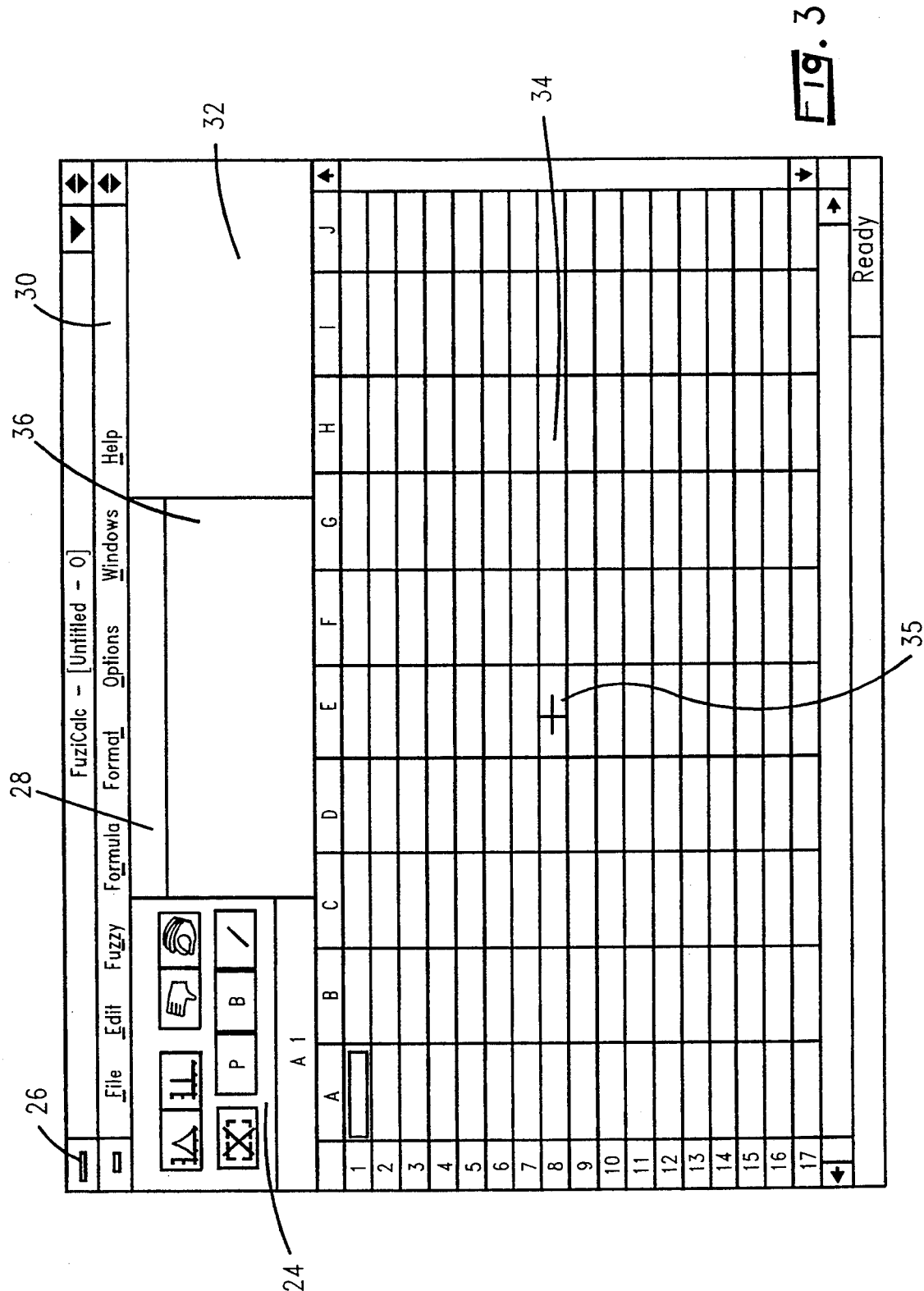
FIG. 3 is a spreadsheet display of the present invention showing a basic layout of the components of the preferred embodiment.

When FuziCalc is started under Windows, a screen appears as shown in FIG. 3, which includes the following windows: Toolbox 24, Control Menu Box 26, Text Edit Window 28, Menu Bar 30, Fuzzy Value Window 32, and document window 34. The document window 34 shows a spreadsheet in the form of a grid of rows 1 2 3 ... and columns A B C.... One utilizes the various functions depicted on the screen by positioning a cursor 35 on the screen using a mouse 16 and clicking on the desired function. Also, the program may be controlled through the keyboard. The program includes the capability of changing the view of the application, minimizing the view of the application, and naming and saving the spreadsheet, which are conventional.

To select a cell for entering data, the cursor is placed on a cell, such as B1 and clicked. Also, groups of cells may be selected by placing the cursor on a cell, depressing the mouse button and dragging the cursor across a range of selected cells, and releasing the mouse button when the cursor 35 is in the desired position. It is understood that dragging is accomplished by placing the cursor on a desired location, pressing and holding the mouse button, moving the mouse to move the cursor as desired, and releasing the mouse button when the cursor is in the desired position. Keyboard inputs may also be utilized to adjust the size of the columns and rows.

To use the spreadsheet, a cell is selected by clicking on it and the selected cell will be highlighted by a bold box around it. Next, text or numbers are typed and they will appear in the text edit bar 28. When the information in the text edit bar appears acceptable, the enter key is pressed and the information in the text edit bar is transferred to the cell. For example, FIG. 4 shows a spreadsheet wherein the number 160 has been entered into the text bar and then transferred to cell C3. As may be appreciated by reference to FIG. 4, different combinations of text and numbers may be entered into the various cells. In addition, the contents of a cell may be represented by a formula. For example, referring to FIG. 4, cell D7 represents cell D3 multiplied by cell D4. To designate the formula representing D7, one first clicks on cell D7, types the formula "=D3*D4" in the text bar 28 and then presses enter. At that point, the product of cells D3 and D4 will appear in cell D7. It will be recognized that this procedure of entering data and formulas into the spreadsheet is intuitive to those persons having some familiarity with spreadsheet programs.

Figure 5A:
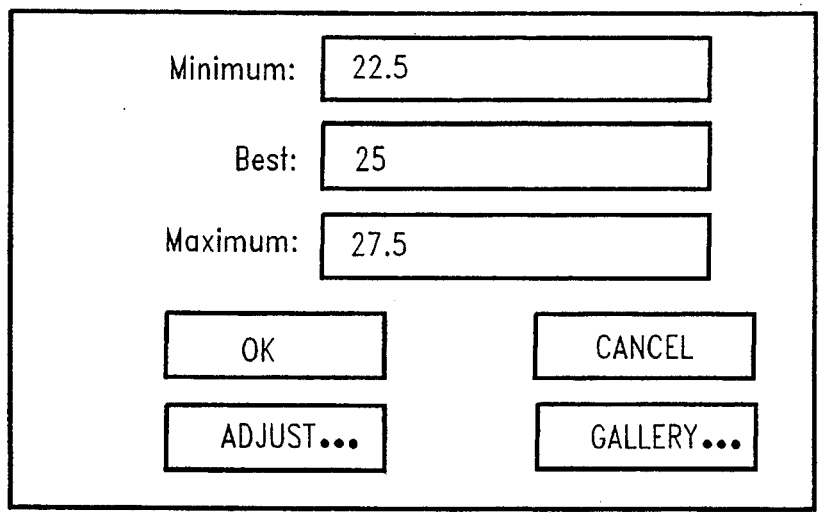
FIG. 5A shows a fuzzy dialog box which represents a fuzzy number and is used to enter and adjust fuzzy numbers.
Figure 5B:
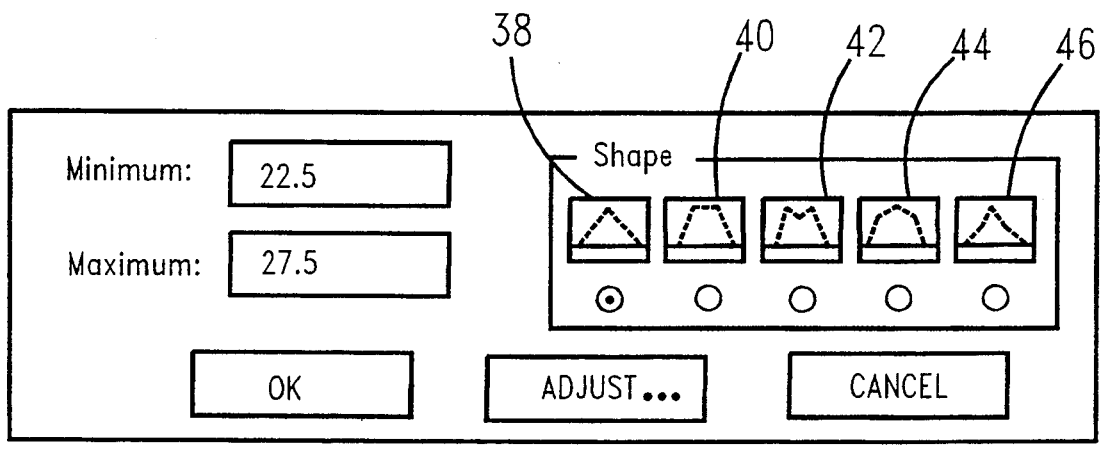
FIG. 5B shows a display of a gallery of graphs representing possible shapes of a fuzzy number for use in converting (fuzzifying) a crisp number to fuzzy number.
Figure 6:
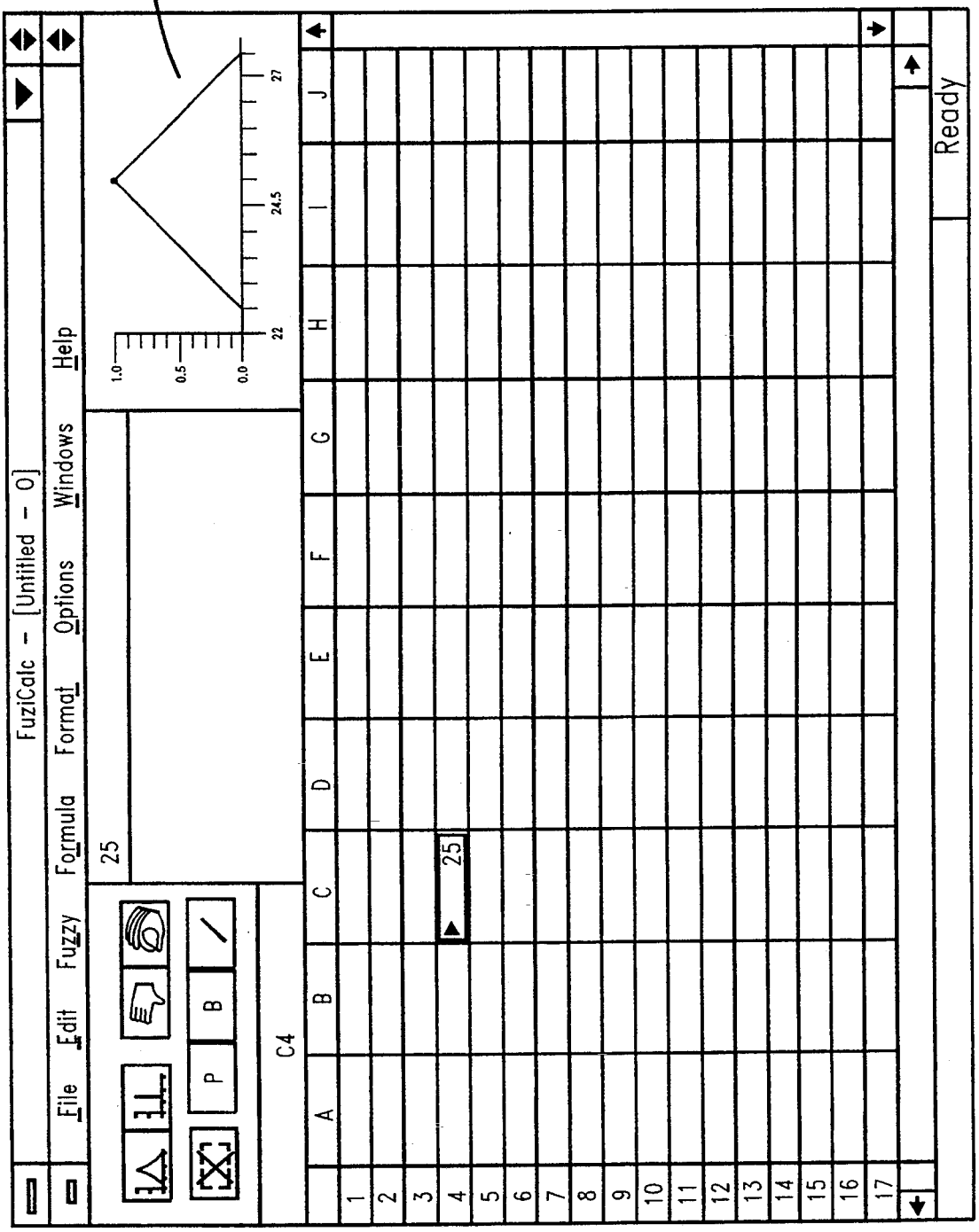
FIG. 6 shows a display of a fuzzy number as both a centroid in a cell of a spreadsheet and a graph of a fuzzy number.

In accordance with the present invention, the program provides a fuzzify command. To begin the process, the user should click on the cell that contains the number that one desires to fuzzify. Next click on the fuzzy graph button (the triangular shape) in the tool box 24 or choose the fuzzify command. A dialog box will appear (FIG. 5A) with the number to be fuzzified in the Best box and suggested values in the Minimum and Maximum boxes that are minus 10% and plus 10%, respectively. Any of these three values can be changed to completely specify a triangular fuzzy number. Alternately, a user may click on the gallery button to open a dialog box with five different shapes (FIG. 5b). Any of these shapes may be selected by clicking on the radio button beneath them. These shapes are referred to as a triangular shape 38, a trapezoidal shape 40, a humpback shape 42, a tent shape 44, and a spire shape 46. Each of these shapes is provided to facilitate the rapid definition of an appropriate fuzzy number. Minimum and maximum values may be input or the default values may be accepted. In either case the gallery shapes are applied symmetrically within the specified range. Clicking on the OK button or pressing ENTER fuzzifies the number and the graph of the fuzzy number appears in the fuzzy window as shown in FIG. 6. Also, a gray triangle appears at the left of the active cell to remind the user that the number in the cell is fuzzy.

A fuzzy number (or value) must have at least three points, but there is no limit on the maximum number of points. To view a fuzzy value in detail, the user may double click on the cell on the spreadsheet and the Adjust Fuzzy Value Dialog Box shown in FIG. 7 appears. One may display any fuzzy value in a cell, but one may alter only a fuzzy value that is not the result of a formula. To adjust a graph, the cursor is placed on the graph using the mouse 16, the mouse is double clicked creating a new point on the graph, and the cursor, new point and graph are dragged to a desired location where the mouse button is released. Using the same drag technique, an existing point on the graph may be moved as desired. To select an existing point for being moved, the cursor is placed on the point and the mouse is dragged. FIG. 8 shows an Adjust Fuzzy Value box that is displaying an adjusted graph 48 which represents an adjustment to the fuzzy value shown in FIGS. 6 and 7. The apex of the triangle has been moved to the right to represent a value of 27.46. Because of the nature of fuzzy numbers, one cannot drag a portion of the graph past a minimum or a maximum value. However, the maximum and minimum values can be adjusted by clicking on them and moving them in the same manner as other points on the graph.

If more accuracy is desired, one may position a cursor on a particular point, hold the shift key and click on the point. In response, a Value and Belief dialog box shown in FIG. 9 will appear. Using the keyboard one enters a precise value and belief and the selected point will be moved to the precise position indicated by the Value and Belief window. To delete a point on a graph, click on a point and press the delete key on the keyboard 14. From the above discussion it will be appreciated that a complex belief distribution may be expressed in a relatively easy-to-understand format by selecting a crisp number and fuzzifying it. The process of fuzzifying is greatly simplified by expressing the fuzzy number as a graph and allowing the user to modify the graph as desired by clicking and dragging portions of the graph to new locations.

The spreadsheet program of the present invention will perform operations on fuzzy numbers and/or crisp numbers in the cells. To create a formula, a cell is selected, the "equals" sign is entered and then an appropriate formula is entered using the keyboard. The "star" symbol (*) is used for multiplication, (+) for addition, (−) for subtraction, and (/) for division.

The concept of multiplying, dividing, adding and subtracting fuzzy numbers may best be understood by considering the example below showing how mathematical functions are performed.

To add the two fuzzy numbers:
a1=(1,0) (5,0.25) (10,1) (20,0)
a2=(5,0) (8,0.6) (15,1) (16,0.25) (20,0) such that
a3=a1+a2,
the first step is to find the low limit and high limit for the result (a3). The low limit of a3 is found by adding the low limit of a1 and the low limit of a2. Likewise, the high limit of a3 is the sum of the high limit of a1 and the high limit of a2. The belief value of both the high and low limits of a3 will, of course, be zero (0).

Thus, in this example, the low limit is given by:

(1,0)+(5,0)=(6,0)

and the high limit by:

(20,0)+(20,0)=(40,0).

Next, each of the non-limiting points in a1 is added to each of the non-limiting points of a2 and the minimum belief value of each pair is assigned to the sum. Thus:

(5, 0.25)+(8, 0.6)=(13, 0.25)

(5, 0.25)+(15, 1)=(20, 0.25)

(5, 0.25)+(16, 0.25)=(21, 0.25)

(10, 1)+(8, 0.6)=(18, 0.6)

(10, 1)+(15, 1)=(25, 1)

(10, 1)+(16, 0.25)=(26, 0.25)

The values obtained above are then sorted according to their numeric values (not their belief values) to obtain an intermediate set of points. In this example, the intermediate set of points becomes:
(13, 0.25)
(18, 0.6)
(20, 0.25)
(21, 0.25)
(25, 1)
(26, 0.25)
The proper number of points for the result of the sum is determined as the maximum point count of either of the inputs. In the example, a1 had 4 points and a2 had 5 points so that the result, a3, should have 5 points.

The intermediate point list must be subdivided into the proper number of bins to generate the desired point count, the desired point count less 2 (limits have been pre-determined). In the example, the intermediate point list must therefore be subdivided into 3 bins (5−2=3).

Binning of the intermediate points is performed by combining groups of points into each bin. The number of points per group is given by the number of points divided by the number of desired bins. In the example, 6 intermediate points divided by 3 bins yields 2 points to be combined per bin (6/3=2).

Intermediate points are combined by averaging the numerical values of all points in the group, and assigning the largest belief value of the points in the group to the result. Thus, in the example, the intermediate points are placed into the three bins as follows:

| (13, .25) | (18, .6)  | → | (15.5, .6)  |
| (20, .25) | (21, .25) | → | (20.5, .25) |
| (25, 1)   | (26, .25) | → | (25.5, 1)   |

The contents of these bins are the intermediate points of the result, which in combination with the limiting values form the fuzzy result. Thus, for the example, the result of the sum is given by:

$$a3 = (6, 0)\ (15.5, 0.6)\ (20.5, 0.25)\ (25.5, 1)\ (40, 0)$$

The procedures for subtracting, multiplying and dividing fuzzy numbers are essentially the same as that set out for addition above. Only two procedural differences exist for each of these operations.

The primary and obvious, difference is that the mathematical operation desired (subtraction, multiplication or division) must be substituted for addition in the determination of the intermediate point list.

The second procedural difference is the determination of the limiting values for the result. Limit determination is dictated by the actual operation being applied. For subtraction (a1−a2), the high limit of the result is computed by subtracting the low limit of a2 from the high limit of a1. The low limit of the result is the low limit of a1 minus the high limit of a2.

For multiplication (a1 * a2) or division (a1/a2), due to the nature of the mathematical operations, no apriori determination of limiting values is possible. Instead, in either of these cases, the four possible limiting values are computed by multiplying (dividing) the low limit of a1 by both the low limit and high limit of a2 and by multiplying (dividing) the high limit of a1 by both the low and high limits of a2. The four resulting values are compared and the product (quotient) with the lowest numerical value is used as the lower limit of the result and the product (quotient) with the highest numerical value is taken as the upper limit of the result.

With these two exceptions, the procedure for adding, subtracting, multiplying and dividing fuzzy numbers are essentially the same.

In addition to the basic mathematical operations, the spreadsheet program contains twenty-two functions which represent operations relating to fuzzy numbers and/or crisp numbers. To select a function one clicks on the word "Formula" or enters "Alt-R" from the keyboard, clicks on the desired function, and then answers "OK". The various functions that one may choose are detailed below.

CRISP (FzNum)

CRISP returns the centroid of the fuzzy value "FzNum".

A single fuzzy argument is required.

FZPERCENT (Num, Pcnt)

FZPERCENT creates a symmetric fuzzy value with its peak at the value "Num" and its limits at + or − "Pcnt" percent of "Num". (i.e. the lower limit is at Num−(Num.(Pcnt/100)).

Two crisp arguments are required.

FZTRIANGLE (Num1, Num2, Num3)

FZTRIANGLE creates a triangular fuzzy value with its lower limit at value "Num1" its peak at value "num2" and its upper limit at "Num3".

Three arguments are required and must all be crisp values.

FZGALLERY (Num1, Num2, Num3)

FZGALLERY creates symmetric fuzzy values from the FuziCalc shape gallery. The fuzzy value created will have lower limit at value "Num1" and upper limit at value "Num2". The argument "Num3" defines the shape to be used as:

| "Num3" | Shape produced |
|--------|----------------|
| 1      | Triangle       |
| 2      | Trapezoid      |
| 3      | Double Hump    |
| 4      | Tent           |
| 5      | Spire          |

Three arguments are required, all of which must be crisp values. "Num1" must be less than "Num2" and the integer component of "Num3" must be one of the above values.

FZPOINTS (Val1, Blf1, Val2, Blf2, ... Valn, Blfn)

The FZPOINTS function produces a fuzzy value from a point list of "value/belief" pairs.

At least six crisp arguments must be provided. (Fuzzy numbers must have at least three points.) There is no upper limit to the number of arguments, but an even number of arguments must be supplied and all must be crisp values. Further, the limiting belief values (Blf1 and Blfn) must both be zero.

FZCONVERT (FzVal, Num)

FZCONVERT converts the fuzzy value "FzVal" to contain "Num" points. "Num" may be larger or smaller than the original point count.

Two arguments are required. The first must be a fuzzy value and the second must be a crisp value whose integral component is at least three.

FZPTVALUE (FzVal, Num)

FZPTVALUE returns the domain value (X) of the "Num" point of the fuzzy number "FzVal". Note that the point count starts with zero (for the lower limit).

Two arguments are required. The first must be a fuzzy value and the second must be crisp. Values of "Num" must be within the point count range of the fuzzy number.

FZPTBELIEF (FzVal, Num)

FZPTBELIEF returns the belief value (Y) of the "Num" point of the fuzzy number "FzVal". Note that the point count starts with zero (for the lower limit).

Two arguments are required. The first must be a fuzzy value and the second must be crisp. Values of "Num" must be within the point count range of the fuzzy number.

FZALPHA (FzVal, Val)

FZALPHA returns the belief value (alpha) of the crisp value "Val" on fuzzy number "FuzVal".

Two arguments are required. The first must be fuzzy and the second crisp. Values of "Val need not correspond to points of the fuzzy value.

FZLIMIT_L (FzVal)

FZLIMIT_L returns the lower limit of the fuzzy number "FzVal".

One fuzzy argument is required.

FZLIMIT_H (FzVal)

FZLIMIT_H returns the upper limit of the fuzzy number "FzVal".

One fuzzy argument is required.

FZPEAK (FzVal, Cut, [Stretch])

The FZPEAK function returns a fuzzy number that is the "top" of the belief graph of fuzzy number "FzVal". This function removes all components of "FzVal" with belief values less than "Cut". If "Stretch" is omitted or equal to zero, components where the belief was less than "Cut" are dropped to the (belief=0) baseline. If a non-zero "Stretch" is supplied, the remaining fuzzy value is scaled (stretched) so that those components which originally had belief between "Cut" and 1 are expanded to fill the range 0 to 1.

At least two arguments are required. The third argument is optional. The first argument must be fuzzy. All others must be crisp. The second argument must be a valid belief cutoff (i.e. between 0 and 1).

MIN_C (Val1, Val2, ... Valn)

MIN_C returns the minimum of all values supplied to it. Crisp values are compared directly. If any fuzzy values are included in the argument list, their centroids are used for the comparison.

Any number of arguments, fuzzy, crisp of mixed, may be supplied. Cell range arguments are also accepted.

MAX_C Val1, Val2, ... Valn)

MAX_C returns the maximum of all values supplied to it. Crisp values are compared directly. If any fuzzy values are included in the argument list, their centroids are used for the comparison.

Any number of arguments, fuzzy, crisp or mixed, may be supplied. Cell range arguments are also accepted.

MIN_L (Val1, Val2, ...Valn)

MIN_L returns the minimum of all values supplied to it. Crisp values are compared directly. If any fuzzy values are included in the argument list, their lower limits are used for the comparison.

Any number of arguments, fuzzy, crisp or mixed, may be supplied. Cell range arguments are also accepted.

MAX_L (Val1, Val2, ... Valn)

MAX_L returns the maximum of all values supplied to it. Crisp values are compared directly. If any fuzzy values are included in the argument list, their upper limits are used for the comparison.

Any number of arguments, fuzzy, crisp or mixed, may be supplied. Cell range arguments are also accepted.

SUM (Val1, Val2, ... Valn)

SUM computes the sum all values to it.

Any number of arguments, fuzzy, crisp or mixed, may be supplied. Cell range arguments are also accepted.

AVG (Val1, Val2, ... Valn)

AVG computes the average of all values supplied to it.

Any number of arguments, fuzzy, crisp or mixed, may be supplied. Cell range arguments are also accepted.

EXP (Value)

EXP returns the exponential function of "Value".

One argument is required and may be crisp or fuzzy.

INV (Value)

INV computes the arithmetic inverse of "Value". One argument is required and may be crisp or fuzzy. Arguments spanning zero will produce "!MERR" errors.

POW (Val1, Val2)

POW raises "Val1" to the "Val2" power.

Two arguments are required and may be crisp, fuzzy or mixed.

LOG (Value)

LOG computes the natural logarithm of "Value".

One argument is required and may be crisp or fuzzy, and must be positive.

Figure 10:
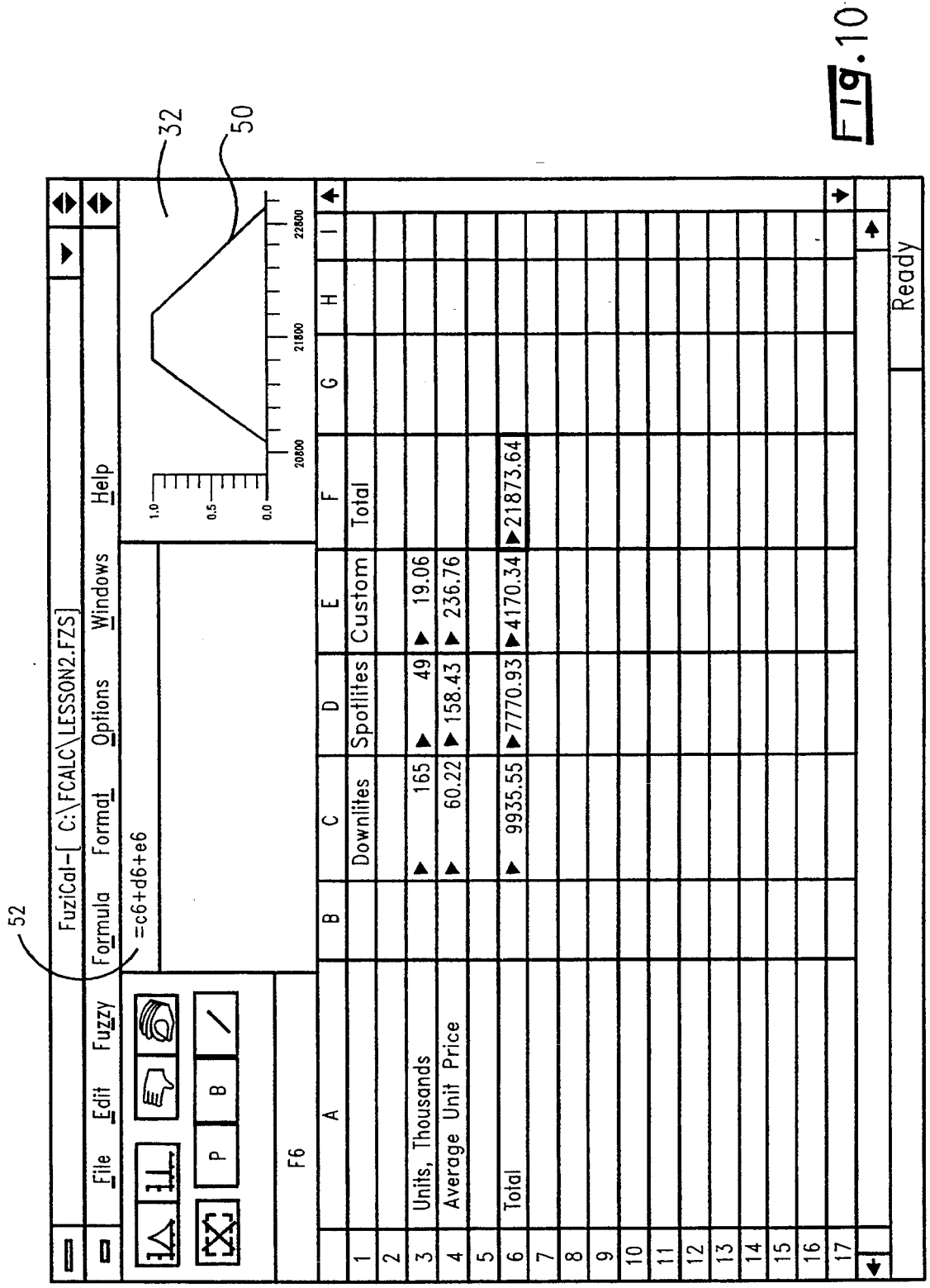
FIG. 10 is a display of a spreadsheet illustrating sales forecasting using fuzzy numbers in a spreadsheet.

To illustrate the use of fuzzy numbers in a particular example, FIG. 10 shows a spreadsheet representing sales forecasting using fuzzy numbers. Row 3 shows the number of units that may be sold, Row 4 shows the average unit price, and Row 6 shows totals. Column C represents anticipated sales of downlights, Column D represents sales of spotlights, and Column E represents sales of custom lights. Each of the numbers represented in C3, C4, C6, D3, D4, D6, E3, E4, E6, and F6 are fuzzy numbers. The numbers in rows 3 and 4 are fuzzy numbers entered by the users and the numbers in row 6 are fuzzy numbers generated by formulas. C6 represents C3 times C4, D6 represents D3 times D4, E6 represents E3 times E4, and F6 represents C6 plus D6 plus E6. The graph 50 in the fuzzy value window 32 represents the fuzzy value of the number shown in cell F6. The number 21873.64 is the centroid of the graph 50 shown in the box 32. The centroid is a value on the graph where the area of the graph on one side of the centroid is equal to the area of the graph on the other side of the centroid. It may be visualized as a balance point. In this particular example, each fuzzy number represents a belief distribution of what the user believes he or she can sell of each product and a belief distribution of the average unit price that the user believes he or she will receive for the unit sold. By entering fuzzy numbers representing these belief distributions, the user is implementing a wide variety of "what if" scenarios simultaneously. The ultimate output graph 50 shown in box 32, shows a belief distribution representing the range of the possible scenarios. The graph 50 shows believed absolute maximum and minimum sales, but the graph accurately reflects that there is a low belief level for values near the absolute maximums and minimums. The graph also shows a belief that the actual sales will be about $22,000, and the centroid ($21873.64) displayed in the F6 cell represents the center of balance of the graph. A belief distribution in the form of a graph of a fuzzy value, such as graph 50, provides a user with more than a range of what if scenarios. It also quantifies the user's belief in each of the scenarios and provides the user with a useful insight into his/her own predictions.

From the foregoing, it will be appreciated that a spreadsheet having the ability to receive, manipulate, operate on and display fuzzy numbers provides a useful tool for managing real world conditions that cannot necessarily be represented by crisp numbers. It will be understood that a while a preferred embodiment is described in the foregoing Detailed Description, the invention is capable of numerous rearrangements, modifications and substitutions without departing from the scope of the invention as defined by the following claims.

We claim:

1. A data processing system for inputting, processing and outputting data in a spreadsheet having rows and columns of cells for containing numbers, text or formulas and wherein the contents of each cell are selectively definable as the result of operations on one or more of the other cells such that changing the contents of one cell selectively impacts other cells, comprising:

a memory;

said memory for holding stored instructions and stored data, said stored instructions and stored data including a data processing representation of said fuzzy spreadsheet including a plurality of cells for holding data;

a processor for processing data;

input means for producing input data and input instructions in response to a user including means for allowing a user to define and input a fuzzy number as an element of said fuzzy spreadsheet;

said processor and memory further comprising:

a controller for receiving input data and input instructions and in response thereto for producing and storing data in said cells, said input data and stored data selectively including fuzzy numbers, a fuzzy number being defined by an upper limit, a lower limit, said upper and lower limits defining a range, and at least one crisp number pair where one number of said pair is a crisp number in the range and the other crisp number of said pair being a non-zero degree of believe; and means for performing fuzzy mathematical operations on the data stored in said cells in response to input instructions and stored instructions to produce derived numbers, said fuzzy mathematical operations including fuzzy mathematical operations on said fuzzy numbers that were selectively stored in said cells of said fuzzy spreadsheet for producing at least a fuzzy number that bears a relationship to at least one of said fuzzy numbers that were stored in said cells on which fuzzy mathematical operations were performed;

wherein said controller stores said fuzzy number in one of said cells of said fuzzy spreadsheet.

2. The system of claim 1 further comprising:

display means for displaying the data in the cells of said fuzzy spreadsheet and for simultaneously displaying two representations of a selected fuzzy number.

3. The system of claim 1 further comprising:

display means for displaying the data in the cells of said fuzzy spreadsheet and for simultaneously displaying two representations of a selected fuzzy number, one of said two representations comprising a graphical representation of the fuzzy number.

4. The system of claim 1 further comprising:

display means for displaying the data in the cells of said fuzzy spreadsheet and for simultaneously displaying two representations of a selected fuzzy number, said two representations comprising a graphical representation of the selected fuzzy number and a numeral corresponding to the centroid of the selected fuzzy number.

5. The system of claim 1:

wherein said input data comprises at least a crisp number; and wherein said processor and memory further comprise a converter for converting crisp numbers to fuzzy numbers.

6. The system of claim 1:

wherein said input data comprises at least a crisp number; and wherein said processor and memory further comprise:

a gallery of graphs stored in said memory representing a plurality of shapes representative of belief distributions;

a converter for converting the crisp number to a fuzzy number by associating said crisp number with a selected one of said graphs in response to input instructions and input data, said input instructions and input data comprising a selection of one of said graphs and at least two additional crisp numbers, said converter producing a fuzzy number based on the crisp number, the selected graph and the two additional crisp numbers.

7. The system of claim 1:

wherein said input data comprises at least a crisp number; and wherein said processor and memory further comprise:

a gallery of graphs stored in said memory representing a plurality of shapes representative of belief distributions;

a convertor for converting the crisp number to a fuzzy number by associating said crisp number with a selected one of said graphs in response to input instructions and input data, said input instructions and input data comprising a selection of one of said graphs and at least two additional crisp numbers, said converter producing a fuzzy number based on the crisp number, the selected graph and the two additional crisp numbers;

display means for displaying a fuzzy number graph corresponding to the crisp number, the two additional crisp numbers, and the graph selected from the gallery of graphs; and adjuster means for adjusting the shape of the fuzzy number graph in response to input data to produce an adjusted fuzzy number graph and modifying the data stored in said cells to correspond to the adjusted fuzzy number graph.

8. The system of claim 1:

wherein said input data comprises at least first, second, and third crisp numbers of ascending values where the third crisp number is greater than the second crisp number which is greater than the first crisp number; and wherein said processor and memory further comprise:

means for storing said first, second and third crisp numbers in a cell of the fuzzy spreadsheet as a fuzzy number wherein said first crisp number represents a minimum value of the fuzzy number and has a belief value of zero, said second crisp number represents the best value associated with the fuzzy number and has a belief value of one, and said third crisp number represents a maximum value of the fuzzy number and has a belief value of zero.

9. The system of claim 1:

wherein said input data comprises at least first, second, and third crisp numbers of ascending values where the third crisp number is greater than the second crisp number which is greater than the first crisp number; and wherein said processor and memory further comprise:

means for storing said first, second and third crisp numbers in a cell of the fuzzy spreadsheet as a fuzzy number wherein said first crisp number represents a minimum value of the fuzzy number and has a belief value of zero, said second crisp number represents the best value associated with the fuzzy number and has a belief value of one, and said third crisp number represents a maximum value of the fuzzy number and has a belief value of zero;

display means for displaying the fuzzy number in the form of a displayed graph having a triangular shape; and adjuster means for adjusting the shape of the displayed graph in response to input data to produce an adjusted graph and modifying the values in the fuzzy number to correspond to the adjusted graph.

10. The system of claim 1 further comprising a display for displaying the fuzzy spreadsheet in the form of rows and columns of spreadsheet numbers and a graph corresponding to a selected spreadsheet number.

11. The system of claim 1 further comprising a display for displaying the fuzzy spreadsheet in the form of rows and columns of spreadsheet numbers and a graph corresponding to a selected spreadsheet number, said graph representing a belief distribution and said selected spreadsheet number representing a centroid, when said selected spreadsheet number is a fuzzy number.

12. The system of claim 1 further comprising a display for displaying the fuzzy spreadsheet in the form of rows and columns of spreadsheet numbers and at least one representation of a fuzzy number.

* * * * *